United States Patent [19]
Czichy et al.

[11] Patent Number: 5,978,123
[45] Date of Patent: Nov. 2, 1999

[54] METHOD FOR THE TRANSMISSION OF A LOW-RATE SUPPLEMENTARY CHANNEL IN HIGH-RATE COHERENT OPTICAL TRANSMISSION SYSTEMS

[75] Inventors: Reinhard Hanno Czichy, Eggersriet; Bernhard Wandernoth, Kirchberg/SG, both of Switzerland

[73] Assignee: Oerlikon Contraves AG, Zürich, Switzerland

[21] Appl. No.: 08/882,266

[22] Filed: Jun. 25, 1997

[30] Foreign Application Priority Data

Oct. 5, 1996 [CH] Switzerland ............... 2414/96

[51] Int. Cl.$^6$ .................................................. H04B 10/04
[52] U.S. Cl. ............................................ 359/183; 359/158
[58] Field of Search ..................... 359/115, 118, 359/110, 158, 183; 375/363

[56] References Cited

U.S. PATENT DOCUMENTS

| | | | |
|---|---|---|---|
| 5,144,469 | 9/1992 | Brahms et al. | 359/158 |
| 5,220,448 | 6/1993 | Vogel et al. | 359/158 |

FOREIGN PATENT DOCUMENTS

| | | |
|---|---|---|
| 0298810 | 6/1988 | European Pat. Off. . |
| 4110138 | 3/1992 | Germany . |

OTHER PUBLICATIONS

P.A. Dawson et al., "TAT–8 Supervisory Subsystem", British Telecommunications Engineering, vol. 5, No. 2, pp. 153–157, Jul. 1986.

B. Wandernoth, "5 Photon/Bit Low Complexity 2 Mbit/s PSk Transmission Breadboard Experiment with Homodyne Receiver Applying Sychronization Bits and Convolutional Coding", European Conference on Optical Communication. pp. 59–62, Sept. 25–29, 1994.

N.D. Stojanovic et al., "Non–Uniform Delta Modulation for Coding of the Service Channel in Optical Systems", Int. J. Electronics, vol. 75, No. 4, pp. 601–605, 1993.

A. Kanbach et al., "ISDN Die Technik", Telekommunikation, pp. 34, 1990.

*Primary Examiner*—Kinfe-Michael Negash
*Attorney, Agent, or Firm*—Browdy and Neimark

[57] ABSTRACT

The invention relates to a method for the transmission of a low-rate supplementary channel 24 in high-rate coherent optical transmission systems for the transmission of supplemental data 26, in particular relating to the operation, in an optical communications link, in which a user data flow 17 in the form of a phase-modulated laser lightwave is transmitted, and and wherein syncbits (synchronization bits) are scattered into the user data flow 17 by a transmitter.

7 Claims, 2 Drawing Sheets

METHOD FOR THE TRANSMISSION OF A LOW-RATE SUPPLEMENTARY CHANNEL IN HIGH-RATE COHERENT OPTICAL TRANSMISSION SYSTEMS

FIELD OF THE INVENTION

The invention relates to a method for the transmission of a low-rate supplementary channel in high-rate coherent optical transmission systems for transmitting supplemental data in particular relating to the operation, in an optical communications connection, wherein user data flow in the form of a phase-modulated laser lightwave is transmitted and wherein syncbits (synchronization bits) are inserted into the user data flow by a transmitter.

BACKGROUND OF THE INVENTION

Besides the actual data to be transmitted, in communication networks there is often the need for conveying information which is used, for example, for creating, monitoring and controlling a connection and for detecting various operational data.

For example, an ISDN subscriber connection also has a service channel, besides two user channels (A. Kanbuch, A. Körber, "ISDN—the Technology", Hüthig, 1990). A supplementary channel with low transmission rate can be implemented in optical transmission systems by means of the customary multiplexing techniques. Multiplexing of different optical wavelengths on a transmission path should be mentioned, which is performed by optical apparatus acting in a wavelength-selective manner, so that a separate transmitter, which operates on a special wavelength, can be used and whose emissions are separately detected.

This principle is refined in the coherent, homodyne reception concept in optical transmission systems.

There is the further option of transmitting, besides multiple user channels, a service channel by chronological multiplexing. Since optical transmission systems offer user channels with very high data rates, very large multiplexers are required for multiplexing a low-rate data flow. For this reason efforts have been undertaken for modulating a service channel on an available user signal by means of special processes (N.B.Stojanovic et al., "Non-Uniform Delta Modulation for Coding of the Service Channel in Optical Systems", International Journal of Electronics, vol. 75, No. 4, pp. 601 to 605).

Such processes have the disadvantage that with increasing channel data rates they either require an analog auxiliary carrier, or that it will be necessary to "multiplex in" a low-rate transmission channel into the data channel by the most elaborate means, namely extremely large multiplexers.

OBJECT AND SUMMARY OF THE INVENTION

It is therefore the object of the instant invention to avoid the disadvantages of the prior art and to disclose a dependable possibility of transmitting low-rate supplementary information together with information at a very high user data rate in an optical manner in coherent optical transmission systems with binary phase shift (BPSK) modulation.

This object is attained in accordance with the invention in that, at regular intervals within the continuous series of the syncbits inserted into the user data flow, the phase of the light used for transmission does not assume the set value of the phase of the superimposed light, but also a value provided for data transmission, which is interpreted as a syncbit violation.

The advantage resulting from the method in accordance with the invention is that it is possible to transmit a supplementary channel via an existing optical transmission channel without requiring increased output or larger bandwidth. A further advantage resides in the very simple technical implementation, since no special and elaborate multiplexers and demultiplexers need to be used. Finally, it is possible by means of very simple measures to achieve a very low probability of bit errors in the supplementary channel.

Further details, features and advantages of the invention ensue not only from the claims and the features to be taken from them, either by themselves and/or in combination, but also from the following description of the preferred exemplary embodiments.

DETAILED DESCRIPTION OF THE PREFERRED EMBODIMENTS

Figure 1:
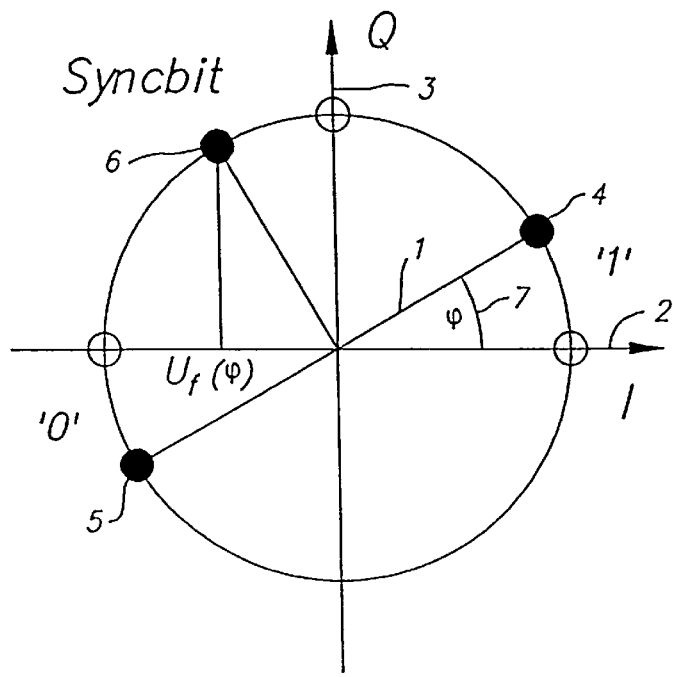
FIG. 1 is a representation of the transmitting diagram in the phase diagram.

FIG. 1 shows a schematic representation of the angle of the phase between light transmitted for data transmission and superimposed light. A pointer 1 used to represent the signal states can be composed of an in-phase portion 2 and a quadrature portion 3 in a right-angled coordinate system. The detected signal results from the in-phase portion 2 of the possible states 4 and 5 of the phase angle between the signal light and the superimposed light. A third state 6 of the pointer 1, represented in FIG. 1, should be assigned to the syncbit inserted into the data flow. As can be seen in FIG. 1, the detected in-phase portion 2 of the signal state 6 corresponds to the error of the phase between signal light and superimposed light, which is to be balanced to a phase difference 7 of zero.

Figure 2:
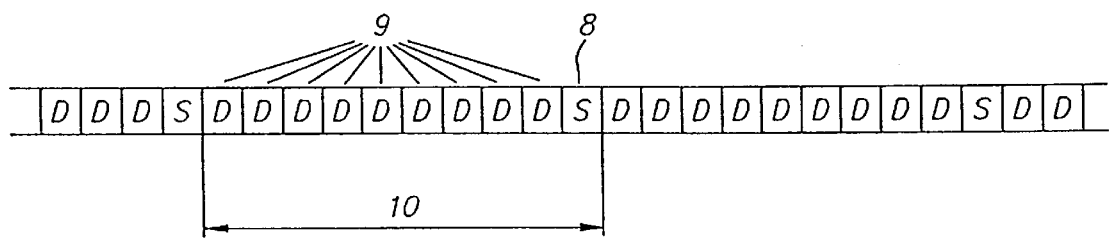
FIG. 2 is a transmission diagram when transmitting syncbits.

FIG. 2 shows a schematic representation of the embedding of the continuous sequence of syncbits 8 in a succession of data bits 9. The data bits 9 appearing between two successive syncbits are combined, together with the succeeding syncbit, into a frame 10.

Figure 3:
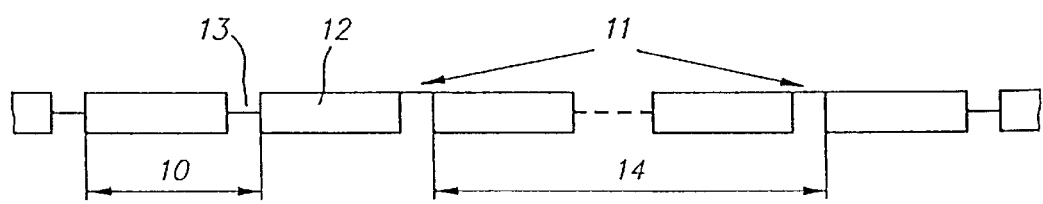
FIG. 3 shows the transmission in a supplementary channel by means of syncbit violation.

FIG. 3 explains the transmission of a low-rate supplementary channel by means of syncbit violations 11 within syncbits 13 scattered continuously between user data bits 12.

There is a bit distance 14 inside the supplementary channel, which corresponds to the distance between the syncbit violations 11.

Figure 4:
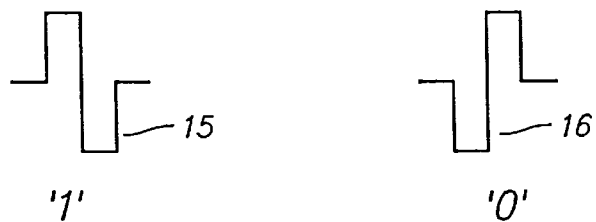
FIG. 4 is a diagram for syncbit violation for logical 1 and 0.
Figure 5:
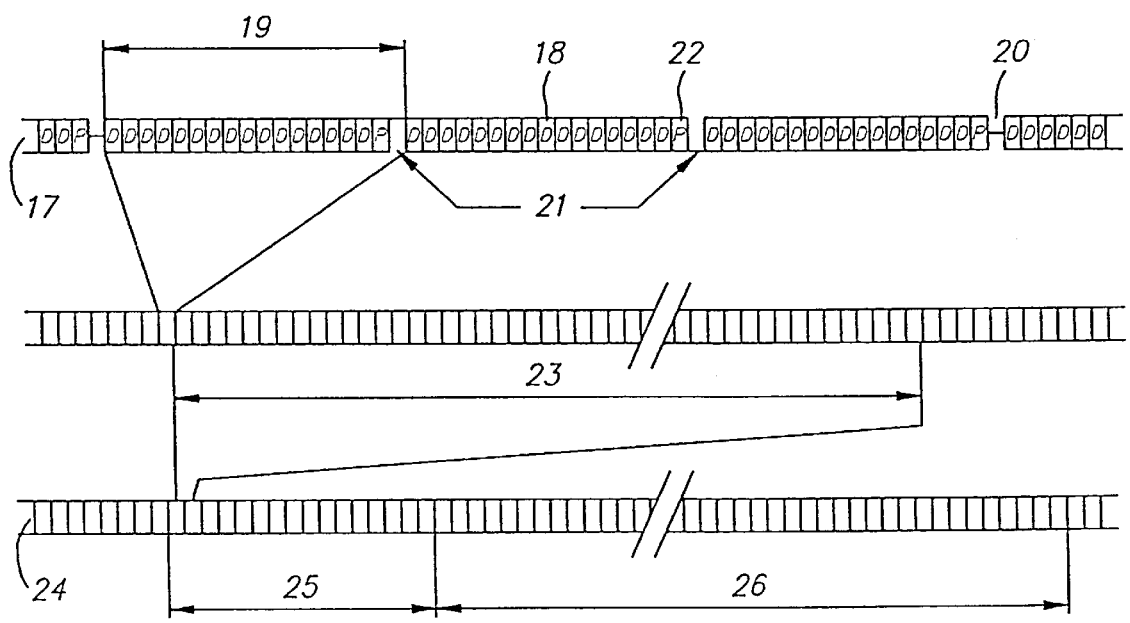
FIG. 5 represents a possible frame diagram for the transmission of a supplementary channel.

FIG. 4 represents an example for the transmission of two logical states with several successive syncbit violations. A logical state "1" 15 differs from a state "0" 16 by the sequence of the polarity of the signal levels coded in two directly successive syncbits. A possible frame diagram in accordance with the invention for transmitting in a supplementary channel is represented in FIG. 5. The user channel 17 has frames 19 consisting of individual data bits 18 in which supplementary channel bits 21 can be present instead of syncbits 20 added at their ends. By the insertion of parity bits 22, the required structuring of the user data flow in the frame can be used for reducing the probability of undetected transmission errors. The data rate of the supplementary channel is the result of the number of frames N 23 between two supplementary channel bits 21. Finally, a supplementary channel 24 can have a frame structure consisting of a synchronization head and a code sequence 25.

The method in accordance with the invention therefore is used for the low-rate transmission of data in a separate channel inside a high-rate optical homodyne transmission system by means of the modulation of the phase of the laser light used as the carrier. The light of a further laser is superimposed on the light used for the transmission by modulation of the phase in the receiver of an optical homodyne transmission system and is conducted to a photodetector. If the optical frequency of the superimposed light exactly corresponds to that of the signal light, the photo current generated in the detector corresponds to the transmitted data signal. To this end it is advantageous if the phase between the signal light and the superimposed light is +90° or −90°, depending on the logical state of the signal to be detected. To this end the phase of the superimposed light must track the signal light.

Several devices and methods for this with their specific disadvantages for optical transmission systems are known, such as the residual carrier method and the Costas loop.

The so-called syncbit method is described in German Letters Patent 41 10 138 C1 as a further way for aligning the phase of the superimposed light with that of the signal light. To this end the light of the optical transmitter is set at regular intervals to the mean phase value between the data phase (±90°) for the length of a data bit. For lesser deviations of the phase of the superimposed light in the receiver, the photo current in the syncbits generated in the detector is approximately proportional to the phase difference. The error signal obtained by this can be used for readjustment. The required distance between individual syncbits is defined by the phase stability of both laser systems. As a rule each ninth to thirty-third data bit is replaced by a syncbit, by means of which the theoretically maximally possible distance between two syncbits cannot be achieved in most cases.

Therefore the method in accordance with the invention contains the use of a small portion of the regularly inserted syncbits for the low-rate transmission of data. This is achieved in that the phase of the light employed for transmission does not assume the set value of the superimposed light, but a value which is also used for data transmission, at regular intervals within the continuous series of the syncbits inserted into the user data flow. The receiver already has the features required for extracting the syncbits and can be refitted with little outlay for the detection of the inserted data bits.

Therefore only a counter for detecting the distance between the data bits inserted into the series of the syncbits is required in place of a demultiplexer. Since only a small portion of the syncbits is violated in this way, there is no essential impairment of the actual function of these signals; at the same time the data rate of the supplementary channel gained by this is reduced to low values in comparison with the user data rate (see FIG. 3).

The data rate for a supplementary channel is simply obtained by the channel data rate divided by the number of data bits between two syncbit violations.

EXAMPLE

| | |
|---|---|
| Net data rate | 1 Gbit/s |
| Channel frame length | 17 bits (= 16 data bits + 1 syncbit) |
| Desired supplementary channel rate | 100 kbits/s |

Thus, the channel frame frequency is 1 GHz/16 bits=62.5 MHz, so that the desired supplementary channel data rate is obtained if each 625th syncbit is replaced by a supplementary channel bit.

The phase noise of the laser used for the transmission is important for one for the lower limit of the distance between the syncbit violations, as well as the structure of the frame synchronizer. Simulations have shown that the system properties remain almost unchanged down to a distance of ten frames between two supplementary channel bits.

However, the violation of a syncbit cannot be detected with the same assurance as it is possible to differentiate between the two signal levels used for the transmission of the user data, since the difference of the photo current is halved. In order to assure a safe synchronization to the syncbit violations (=supplementary channel bits), it has been shown to be advantageous to code the individual bits transmitted in the supplementary channel by means of several successive signals, i.e. syncbit violations. In this connection an even number of successive alternating signal levels assures a signal free of mean values, by means of which a disadvantageous effect of the supplementary channel on the tracking of the phase of the superimposed light is avoided.

It is interesting in this connection that the signal-interference distance for the syncbits is less by 6 dB than for the data bits. In order to assure a safe synchronization to the syncbit violations, it is advantageous that a supplementary channel bit is represented not only by a simple syncbit violation, but by two or more directly successive syncbit violations. The value of the supplementary channel bits in this case is represented by the value of the first syncbit violation.

An even number of successive alternating syncbit violations (see FIG. 4) is particularly advantageous, since by means of this freedom from mean values is obtained independently of the supplementary channel data. Simulations have shown that as a rule two successive syncbit violations are entirely sufficient.

The method executed in this way offers the additional advantage that the error probability for the supplementary channel can be improved in respect to the user data channel if the respective data discriminator makes information regarding the "strength" of a bit (soft decision) available. In this case it is possible to add the soft decision values of the successive syncbit violations (corrected for polarity) prior to the bit decision. With each doubling of the number of syncbit violations per supplementary channel bit a signal-interference distance improvement of 3 dB results.

What is claimed is:

1. In a method of high-rate coherent optical communications including transmitting user data (17) via phase modulation of an optical carrier lightwave, wherein zero-phase syncbits are embedded in the user data, the improvement comprising: replacing, at regular intervals, one of the zero-phase syncbits (20) by a bit having a value of phase modulation which is used for data transmission, which replacement is to be interpreted as a syncbit violation (II);

using the syncbit violations (11) for a transmission of supplementary channel bits (21); and coding each supplementary channel bit (21) by a plurality of successive syncbit violations (11);

whereby the syncbit violations comprise a low-rate supplementary channel (24).

2. The improvement according to claim 1, comprising forming alternatingly the successive syncbit violations (11) which represent a supplementary channel bit (21).

3. The improvement according to claim 2, comprising, prior to the bit decision, adding soft-decision analog values of the successive syncbit violations (11) representing a supplementary channel bit (21), and correcting for polarity the soft-decision analog values of the successive syncbit violations (11), whereby bit error probability in the supplementary channel (24) is reduced.

4. The improvement according to claim 2, comprising providing the supplementary channel (24) with a frame structure thereof, which optionally is different from a user data structure.

5. The improvement according to claim 1, comprising, prior to the bit decision, adding soft-decision analog values of the successive syncbit violations (11) representing a supplementary channel bit (21), and correcting for polarity the soft-decision analog values of the successive syncbit violations (11), whereby bit error probability in the supplementary channel (24) is reduced.

6. The improvement according to claim 5, comprising providing the supplementary channel (24) with a frame structure thereof, which optionally is different from a user data structure.

7. The improvement according to claim 1, comprising providing the supplementary channel (24) with a frame structure thereof, which optionally is different from a user data structure.

* * * * *